United States Patent [19]
Lee et al.

[11] Patent Number: 6,163,388
[45] Date of Patent: Dec. 19, 2000

[54] APPARATUS AND METHOD FOR AUTOMATIC SCANNING

[75] Inventors: Wayne Lee, Miao Li; Jenn-Tsair Tsai, Taipei Hsien, both of Taiwan

[73] Assignee: Mustek Systems, Inc., Taiwan

[21] Appl. No.: 08/962,666

[22] Filed: Nov. 3, 1997

[51] Int. Cl.[7] .................................................. H04N 1/04
[52] U.S. Cl. .......................................... 358/488; 358/497
[58] Field of Search .................................. 358/488, 497, 358/494, 474, 471; 355/75; 399/17, 376, 380, 13, 16, 88, 12

[56] References Cited

U.S. PATENT DOCUMENTS

| | | | |
|---|---|---|---|
| 5,038,173 | 8/1991 | Kusumoto | 399/13 |
| 5,673,126 | 9/1997 | Ando | 358/498 |
| 5,682,252 | 10/1997 | Ando | 358/461 |
| 5,778,276 | 7/1998 | Hasegawa | 399/17 |
| 5,900,950 | 5/1999 | Hsu | 358/497 |
| 5,917,616 | 6/1999 | Chou et al. | 358/488 |

*Primary Examiner*—Cheukfan Lee
*Attorney, Agent, or Firm*—McDermott, Will & Emery

[57] ABSTRACT

An apparatus for automatic scanning a document is described. The automatic scanning apparatus including a scanning device which is used for scanning a document, the scanning device being positioned at a home position when the scanner is not in use. The other component is a driving device moving the scanning device from the home position responsive to a signal. Another component is a sensor device providing the signal for driving the driving device to move the scanning device from home position, the sensor device produces the signal according to the position of the cover. When the cover is positioned on the surface of the transparent plate, the sensor device generates the signal, and the driving device moves the scanning device responsive to the signal. The sensor device includes a sensor base and a sensor dog, the sensor base including a housing for providing space for accepting the sensor dog.

6 Claims, 5 Drawing Sheets

APPARATUS AND METHOD FOR AUTOMATIC SCANNING

BACKGROUND OF THE INVENTION

1. Field of the Invention

The present invention is related generally to the field of document scanning, and more particularly related to apparatus and method for document automatic scanning.

2. Description of the Prior Art

To acquire the digital image of a document, the user utilizes a scanner to scan the document. In a flatbed scanner, the scan head is positioned at a home position when the scanner is not in use. When the user wants to scan a document, the user puts the document on the glass plate of the scanner and close the cover of the scanner.

In addition, the user has to press the button on the window of the user interface (UI) menu, which is an application software (AP) on the computer, to start scanning. After the application software is activated and the button of the window of the user interface menu is pressed, the CPU (Center Processing Unit) of the computer sends a signal to the scanner to make the scan head of the scanner move from home position. Thus the scan head starts scanning from home position to the end of the glass plate of the scanner. For some type of scanner, the CPU is built in the scanner.

In the other type of scanner, there is a button on the case of the scanner. When the user wants to scan a document, the user puts the document on the glass plate of the scanner and close the cover of the scanner. Next, the user has to press the button on the case of the scanner to start scanning. After the button on the case is pressed, CPU (Center Processing Unit) of the computer sends a signal to the scanner to make the scan head of the scanner move from home position to the end of the glass plate. Thus, the scan head starting scanning from home position to the end of the glass plate of the scanner. For some type of scanner, there is a CPU in the scanner.

SUMMARY OF THE INVENTION

The present invention is related generally to the field of document scanning, and more particularly related to apparatus and method for document automatic scanning. An apparatus for automatic scanning a document is described. The automatic scanning apparatus includes a scanning device that is used for scanning a document, the scanning device being positioned at a home position when the scanner is not in use. The other component is a driving device moving the scanning device from the home position responsive to a signal. Another component is a sensor device providing the signal for driving the driving device to move the scanning device from home position. The sensor device produces the signal according to the position of the cover. When the cover is positioned on the surface of the transparent plate, the sensor device generates the signal, and the driving device moves the scanning device responsive to the signal. The sensor device comprises a sensor base and a sensor dog, the sensor base including a housing for providing space for accepting the sensor dog.

The sensor base provides light flux in the housing, and the sensor dog provides light flux change in the housing for generating the signal. The sensor base includes a photo source and a photo detector, and the housing is between the photo source and the photo detector. The light is prevented from passing the housing, thus the light flux is changed when the sensor dog is positioned in the housing. The other structure of the sensor dog operates according to the following. The sensor base provides magnetic flux in the housing, and the sensor dog provides magnetic flux change in the housing for generating the signal.

The sensor base comprises a magnetic detecting coil. The sensor dog comprises a magnetic head. The housing is between the magnetic detecting coil and the magnetic head, the magnetic field is changed when the sensor dog is positioned in the housing, thus the magnetic flux is changed. The sensor dog is positioned in the housing when the cover is positioned on the surface of the transparent plate.

The other apparatus for automatic scanning is disclosed. The apparatus including the devices described below. The scanning device that is used to scan the document includes a light source and a photo-detecting device, the scanning device being positioned at a home position when the scanner is not in use, the photo-detecting device comprises a first portion. The reflective piece is used to change the light arriving at the surface of the first portion of the photo-detecting device and thus a signal is generated. The photo-detecting device generates a signal when the light flux at the surface of the photo-detecting device is changed and the scanning device is positioned at the home position. The driving device moves the scanning device responsive to the signal.

The scanner of the present invention also includes a transparent window, the transparent window being positioned at a position corresponding to the reflective piece. The light of the light source passes through the transparent window, reflected by the reflective device, and arrives at the surface of the photo-detecting device to change the light flux on the surface of the photo-detecting device. The photo-detecting device is an array of CCD (charge coupled device) and the reflective piece is positioned at the cover of the scanner.

BRIEF DESCRIPTION OF THE DRAWINGS

The above features of the present invention will be more clearly understood from consideration of the following descriptions in connection with accompanying drawings in which.

DESCRIPTION OF THE PREFERRED EMBODIMENT

It is inconvenient for the user to utilize the traditional scanner to obtain a digital image because the users have to press an addition button on the user interface or the case of the scanner. To improve the disadvantage mentioned above, the present inventions offer an apparatus and method to execute scanning automatically. In the present invention, after the document is placed on the transparent plate of the scanner and the cover of the scanner is positioned on the surface of the transparent plate (document), the scanners thus start scanning. The transparent plate in the present invention is made of glass or any material that is transparent.

Figure 1A:
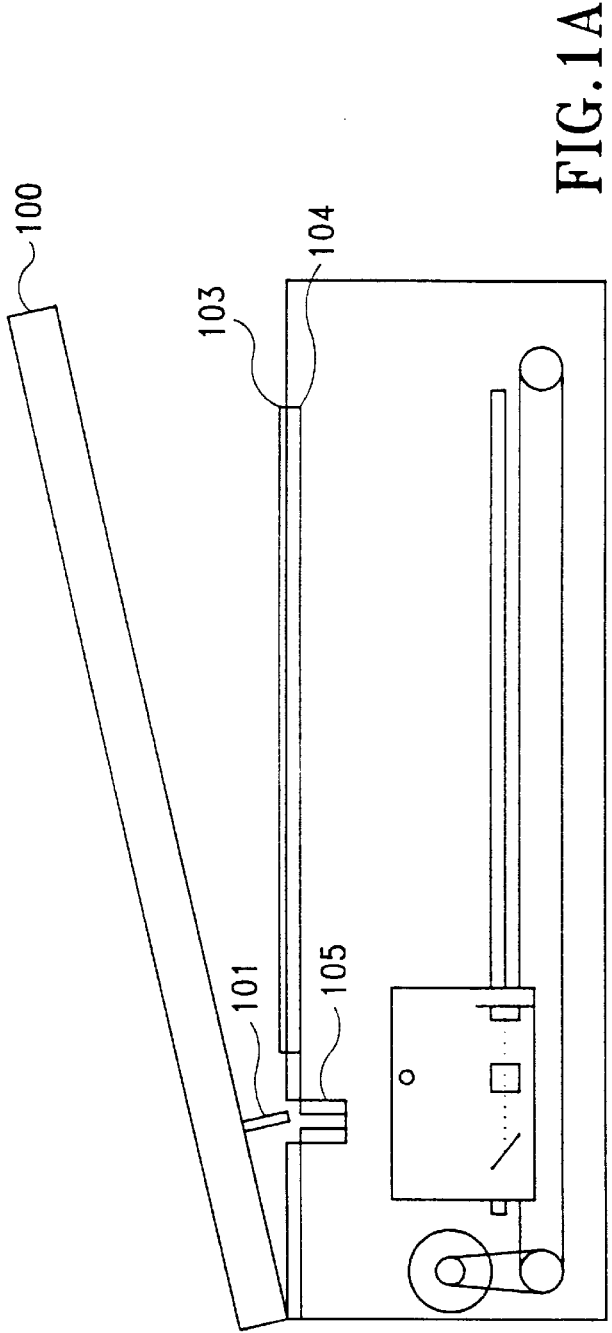
FIG. 1A is the cross sectional view of the scanner according to the first preferred embodiment in present invention. The cover of the scanner is opened and the scanner is not in use.

The first preferred embodiment is described below. Referring to FIG. 1A, the cover 100 of the scanner are opened and the sensor dog 101 is under the cover 100. The document 103 is placed at the surface of the transparent plate 104. The sensor base 105 and sensor dog 101 are in the corresponding position that when the cover 100 is closed by the user, the sensor dog 101 are positioned in the sensor base 105. The sensor including a sensor dog 101 and a sensor base 105.

Figure 1B:
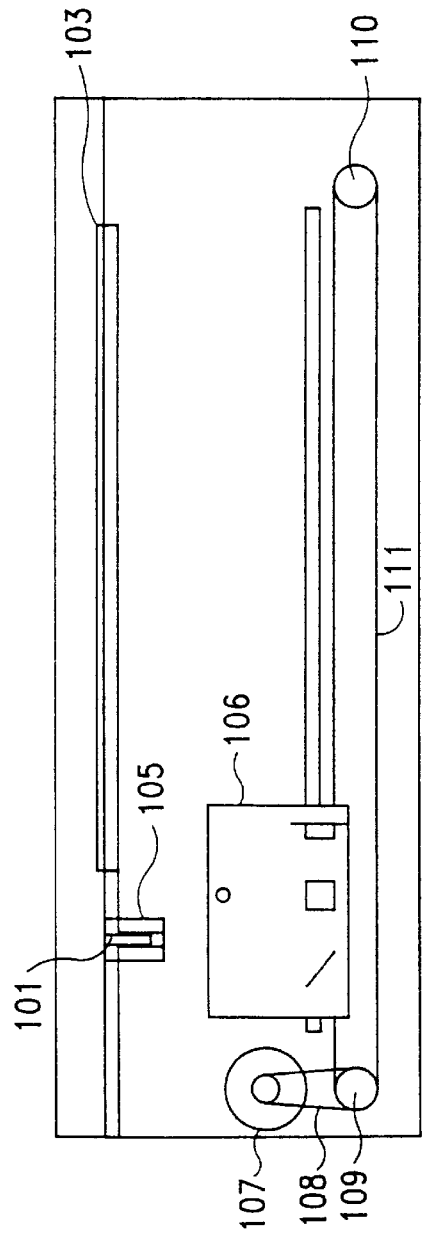
FIG. 1B is the cross sectional view of the scanner in the present invention. The sensor dog is inserted in the sensor base when the cover of the scanner is closed.

Referring to FIG. 1B, when the user wants to scan the document 103, the user close the cover 100 and the cover 100 suppresses the surface of the transparent plate 104, e.g., the cover 100 is positioned on the surface of the transparent plate 104. The sensor dog 101 is thus inserted in the sensor base 105 and the scan head 106 is differentiated by the driving means and begins scanning. The driving means includes the following: the motor 107, the belt 108, the first pulley 109, the second pulley 110, the wire 111, and the guide rail 112. When the motor 107 is differentiated, the belt 108 transmits the force generated by the motor 107 to the first pulley 109. The scan head 106 is pulled by the wire 111 between the first pulley 109 and the second pulley 110, and move along the guide rail 112. The movement of the scan head 106 of the following preferred embodiments is executed as the principle described above.

Figure 2B:
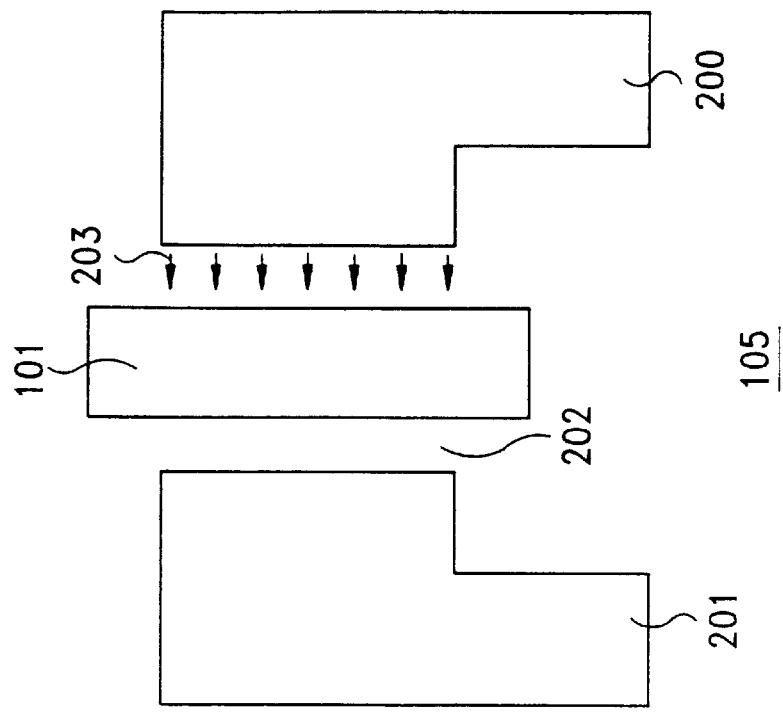
FIG. 2B shows the cross sectional view of the sensor base and the sensor dog of the first preferred embodiment in the present invention.
Figure 2A:
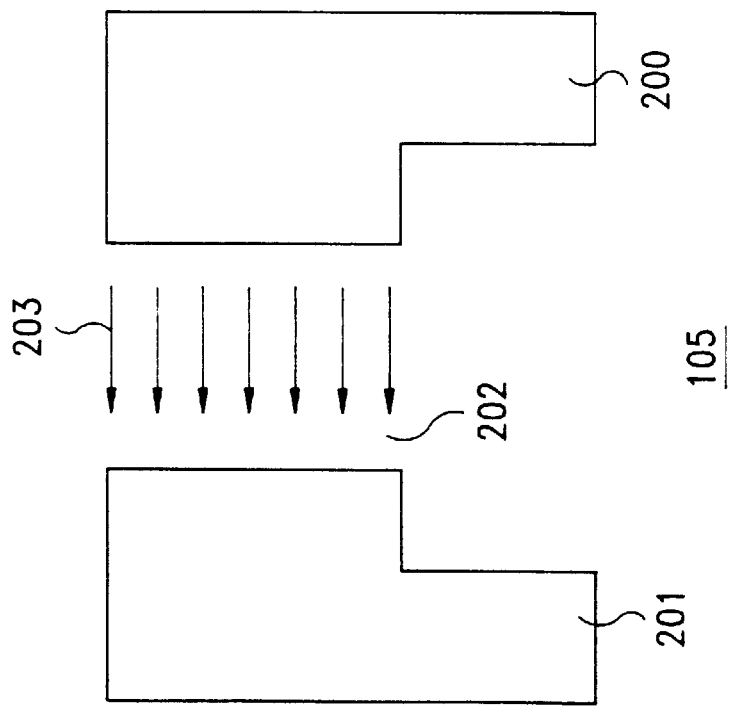
FIG. 2A is the cross sectional view of the sensor base of the first preferred embodiment in the present invention.

Referring to FIG. 2A, the sensor base 105 including a photo source 200, a photo receiver 201 and a housing 202, the housing 202 is between the photo source 200 and the photo receiver 201. When there is not any barrier between the photo source 200 and the photo receiver 201, the light flux of the housing is large, because the light 203 emitted by the photo source 200 arrives at the photo receiver 201.

Referring to FIG. 2B, the sensor dog 101 is inserted in the housing 202. Thus the light 203 emitted by the photo source 200 is prevented from arriving at the photo receiver 201 and the light flux of the housing 202 is mostly reduced. The photo receiver 201 is made of photo-electric material, and the output current change from high to low when the light flux of the housing 202 changes from high to low. The CPU sends a signal to the motor 107 (FIG. 1B) responsive to the current change. Thus the scan head 106 in FIG. 1B is driven by the motor 107 and the scanner begins scanning.

Figure 3B:
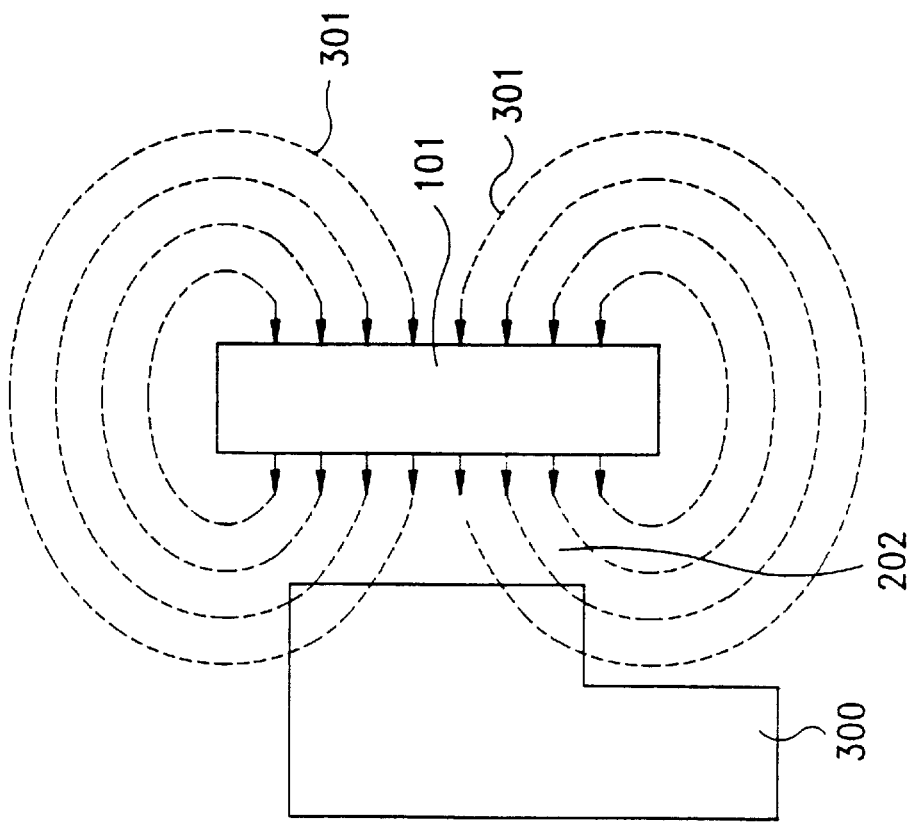
FIG. 3B shows the cross sectional view of the other type of the sensor base and the sensor dog of the first preferred embodiment in the present invention.
Figure 3A:
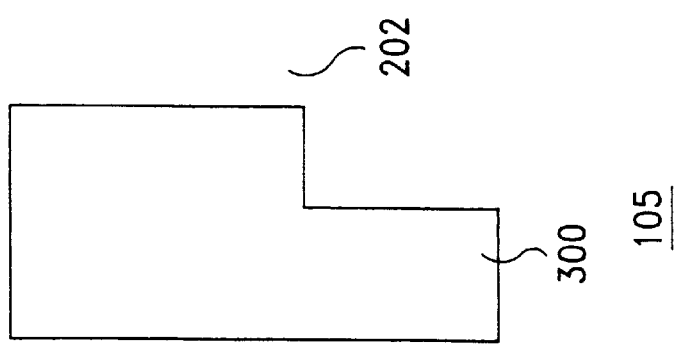
FIG. 3A is the cross sectional view of the other type of sensor base of the first preferred embodiment in the present invention.

In another type of sensor, referring to FIG. 3A, the sensor dog 101 is made of a magnetic material and the sensor base 105 includes a magnetic field detecting head 300. A magnetic detecting coil is on the surface of the magnetic field detecting head 300 (FIG. 3A). When the sensor dog 101 is not in the housing 202, there is not any magnetic field in the housing 202, so the magnetic flux of the housing 202 is 0. Whereas, referring to FIG. 3B, when the sensor dog 101 is inserted in the housing 202, the magnetic field 301 in the housing 202 is increased, so the magnetic flux of the housing 202 is increased. Thus the magnetic field detecting head 300 generates a current. The CPU sends a signal to the motor 107 (FIG. 1B) responsive to the current change. Thus the scan head 106 in FIG. 1B is driven by the motor 107 and the scanner begins scanning.

Figure 4A:
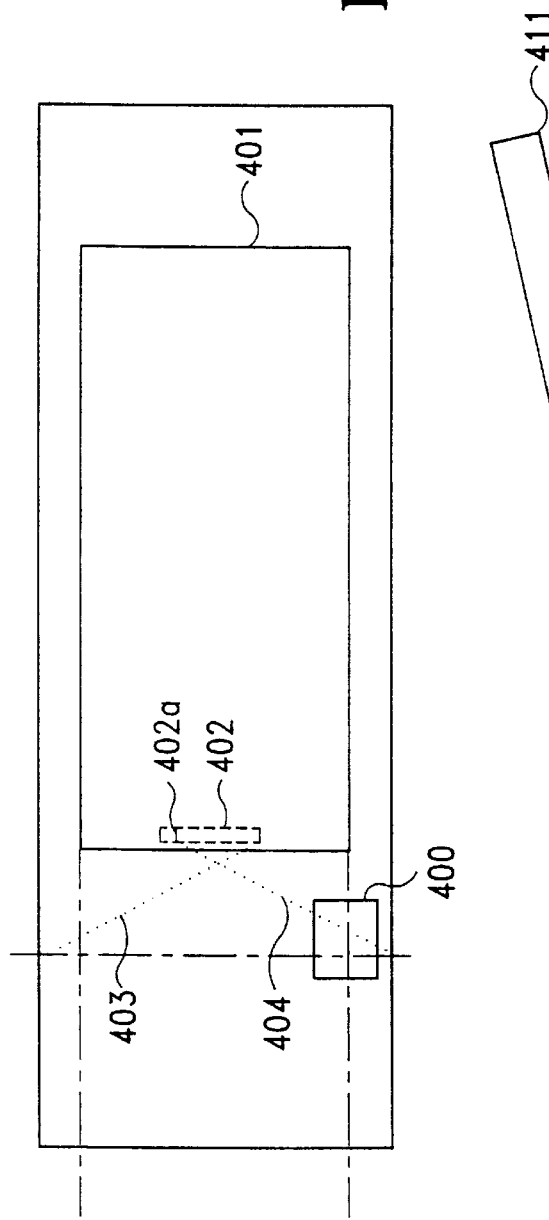
FIG. 4A is top view of the scanner without the cover of the second preferred embodiment in the present invention.

The second preferred embodiment is described below. Referring to FIG. 4A, there is a transparent window 400 and a transparent plate 401 on the top surface of the bottom portion of the scanner. The photo-detecting element 402 is the rectangle drawn in dotted line. When the scanner is not in use, the scan head (not shown in FIG. 4A) is at the home position and the photo-detecting element 402 is at the position shown in FIG. 4A. FIG. 4A also shows that the image between dotted line 403 and 404 is transferred to the photo-detecting element 402. The transparent window 400 is transferred to the first portion 402a of the photo-detecting element 402.

Figure 4B:
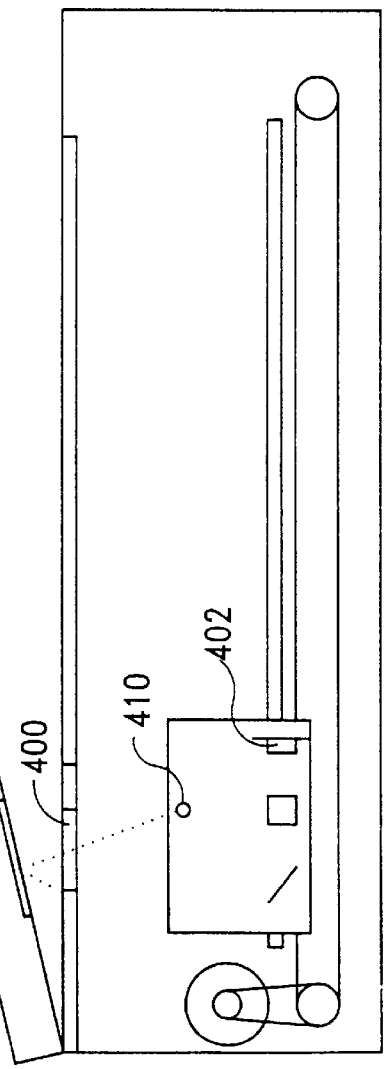
FIG. 4B is the cross sectional view of the scanner according to the second preferred embodiment in present invention. The cover of the scanner is opened and the scanner is not in use.

Referring to FIG. 4B, the cover is opened and the light emitted by the light source 410 pass through the transparent window 400, and the reflected light is reflected to another direction, so there is not any light emitted by the light source 410 arrives at the photo-detecting element 402. When the user wants to scan a document, the user puts the document 103 on the transparent plate 401, and close the cover 411.

Figure 4C:
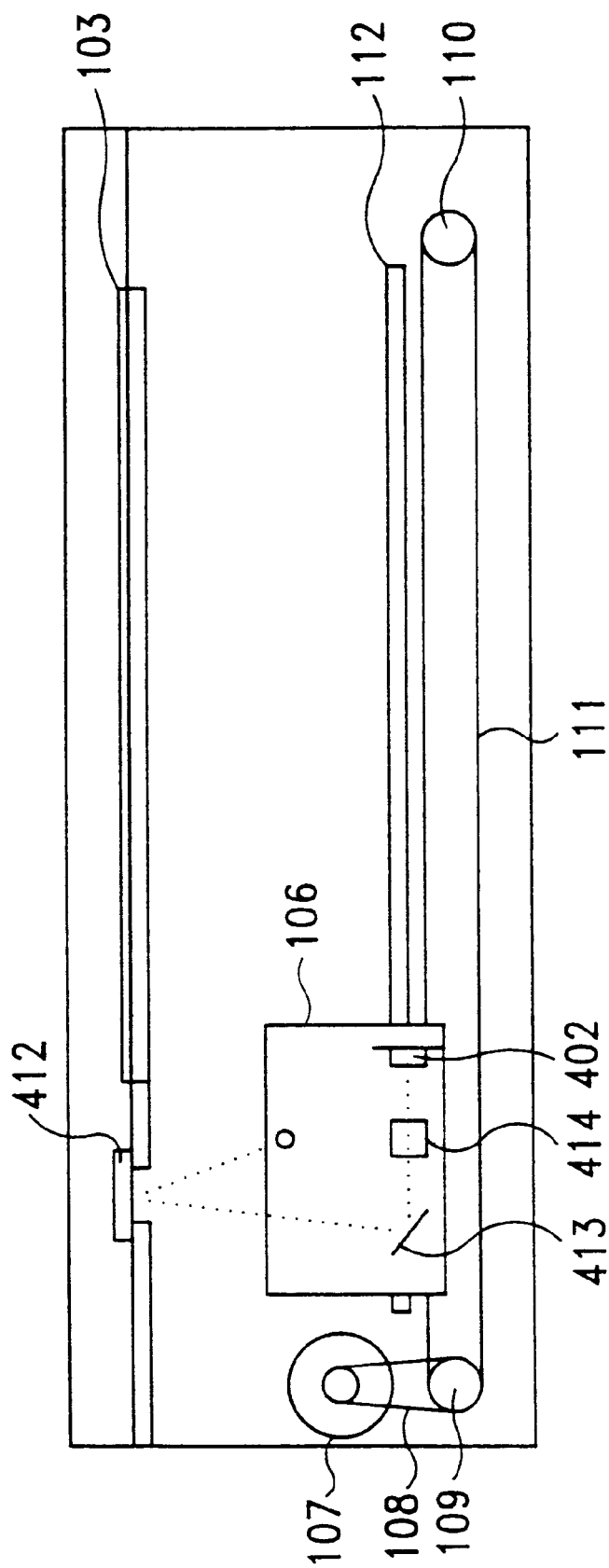
FIG. 4C is the cross sectional view of the scanner in the second preferred embodiment according to the present invention. The light reflected by the reflective piece arrives at the photo-detecting element when the cover of the scanner is closed.

After the user close the cover 411, referring to FIG. 4C, the reflective piece 412 reflects the light emitted by the light source 410 to the mirror 413. Then the light reflected by the mirror 413 passes through the lens 414 and is focused on the photo-detecting element 402. The transparent window 400 is transferred to the first portion 402a of the photo-detecting element 402. The CPU sends a signal to the motor 107 responsive to the output signal of the first portion 402a of photo-detecting element 402. Thus the scan head 106 in FIG. 1B is driven by the motor 107 and the scanner begins scanning. Because the circuit is a simple electric circuit, the configuration is not shown.

Because the scanner according to the present invention can scan the document automatically, the user does not have to press any button on the case of the scanner or on the user interface. It is more convenient for the user to make use of the scanner in the present invention. The photo-detecting element is an array of CCD (charge coupled device).

Although specific embodiments have been illustrated and described, it will be obvious to those skilled in the art that various modifications may be made without departing from the spirit that is intended to be limited solely by the appended claims.

What is claimed is:

1. An apparatus for automatic scanning a document on a transparent plate of a scanner, said scanner starting scanning when a cover of said scanner suppresses the transparent plate of said scanner, said apparatus comprising:

scanning means for scanning the document, said scanning means being positioned at a home position when said scanner is not in use;

driving means for moving said scanning means responsive to a signal, said scanning means being moved from said home position; and sensor means for providing said signal for driving said driving means to move said scanning means from said home position, said sensor means producing said signal according to the position of the cover, when the cover is positioned on the surface of said transparent plate, said sensor means generates said signal, and said driving means moves said scanning means responsive to said signal, said sensor means comprising a sensor base and a sensor dog, said sensor base comprising a housing for providing space for accepting said sensor dog, said sensor dog being used to provide magnetic flux change in said housing for generating said signal, said sensor base comprising a magnetic detecting means, said sensor dog comprising a magnetic head, said housing being beside said magnetic detecting means, the magnetic field being changed when said sensor dog is positioned in said housing, and thus the magnetic flux is changed.

2. The apparatus as claim 1, wherein said sensor dog is positioned in said housing when the cover is positioned on the surface of the transparent plate.

3. The apparatus as claim 2, wherein said sensor dog and said sensor base are at the cover and the plane of transparent plate respectively.

4. A method for automatic scanning a document on a transparent plate of a scanner, said automatic scanning method comprising:

closing a cover of said scanner to insert a sensor dog into a sensor base, said sensor base comprising a housing for providing space for accepting said sensor dog, said sensor base providing magnetic flux in said housing, said sensor dog providing magnetic flux change in said housing for generating said signal;

generating a signal responsive to said magnetic flux change; and driving a scan head at a home position in response to said signal to scan said document.

5. The method as claim 4, wherein said sensor dog is positioned in said housing when the cover is positioned on the surface of the transparent plate.

6. The method as claim 5, wherein said sensor dog and said sensor base are at the cover and the plane of transparent plate respectively.

\* \* \* \* \*